UNITED STATES PATENT OFFICE.

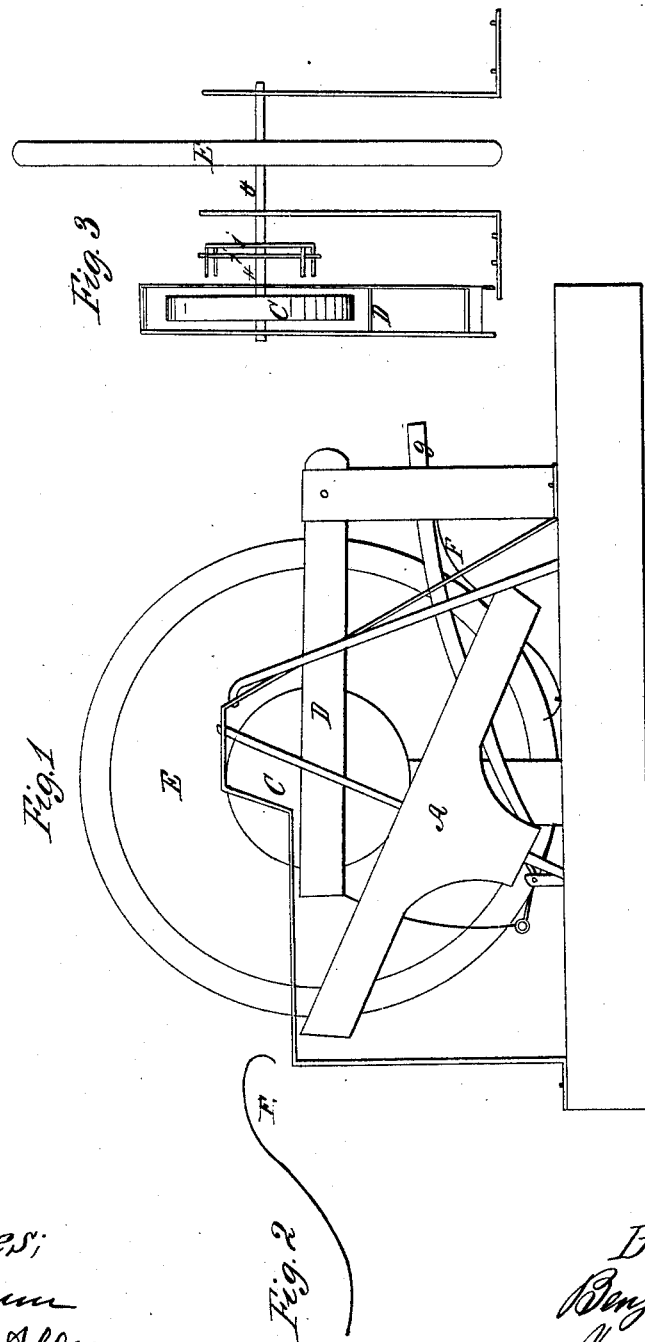

B. F. LOVE AND J. H. FRAZEE, OF SHELBYVILLE, INDIANA.

HORSE-POWER.

Specification of Letters Patent No. 20,279, dated May 18, 1858.

*To all whom it may concern:*

Be it known that we, BENJAMIN F. LOVE and JAMES H. FRAZEE, of Shelbyville, in the county of Shelby and State of Indiana, have invented a new and useful Improvement in the Application of Horse-Power to Propel Machinery, as herein described; and we do hereby declare that the following is a full, clear, and exact description thereof, reference being had to the accompanying drawings and to the letters of reference marked thereon.

The nature of our invention consists in the application of a friction wheel to the disk of a tread wheel so that a uniform force or power may be employed in giving motion to the flywheel and at the same time retaining a perfect connection in such manner that the axle of the friction wheel may be moved in any direction and its axle maintain its parallel with the axle of the fly wheel.

To enable others skilled in the art to make and use our improvement we will proceed to describe the manner in which it is constructed and also its operation.

Figures 1, and 2, are vertical sections. Fig. 3 is a horizontal section.

We construct our tread wheel in any of the known forms and apply thereto a friction wheel hung in a lever in order to allow the friction wheel to be elevated or compressed, to increase or diminish the friction on the disk of the tread wheel and exert its full force on the fly wheel at the same time with the axles parallel with each other.

As tread wheel A, revolves on shaft B, we construct levers D, D, in which and between which we hang wheel C, and thus give motion and force to fly wheel E, by applying wheel C to the disk of tread wheel A, which is done by the force of spring F under the end of lever $g$, and connecting levers $i\ i$ by shafts H, H.

We do not claim the tread-wheel, friction-wheel or fly wheel, knowing that they have been used, but We do claim—

The friction-wheel C, and flywheel E, in combination with spring F, lever $g$, and levers $i\ i$, on the ends of shafts H, H, for the purposes herein set forth.

BENJAMIN F. LOVE.
JAMES H. FRAZEE.

Witnesses:
STEPHEN ALLEN,
JAMES O'BYRNE.